(12) United States Patent
Motoyama

(10) Patent No.: US 7,263,424 B2
(45) Date of Patent: Aug. 28, 2007

(54) APPARATUS AND METHOD FOR CONTROLLING DRIVING FORCE SUPPLIED TO WHEELS ON OPPOSITE SIDES OF VEHICLE

(75) Inventor: Sumio Motoyama, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/175,497

(22) Filed: Jul. 7, 2005

(65) Prior Publication Data

US 2006/0015238 A1 Jan. 19, 2006

(30) Foreign Application Priority Data

Jul. 16, 2004 (JP) ............... 2004-209729

(51) Int. Cl.
*G06F 7/00* (2006.01)
*G06F 17/00* (2006.01)

(52) U.S. Cl. ............ 701/69; 180/201; 180/15; 180/345; 180/197; 315/80; 116/36; 701/1; 701/53; 701/91; 701/87; 701/89

(58) Field of Classification Search .......... 701/29, 701/41, 42, 51, 52, 61, 60, 71, 78, 83, 87, 701/89, 1, 53, 91, 69; 180/6.2, 6.3, 118, 180/119, 197, 204, 234, 242, 243, 245, 246, 180/201, 15, 345; 116/36; 315/80

See application file for complete search history.

(56) References Cited

U.S. PATENT DOCUMENTS

| | | | |
|---|---|---|---|
| 4,681,180 A | | 7/1987 | Oyama et al. |
| 5,388,658 A | * | 2/1995 | Ando et al. ............ 180/197 |
| 5,417,298 A | * | 5/1995 | Shibahata ............. 180/76 |
| 5,648,903 A | * | 7/1997 | Liubakka ............. 701/41 |
| 5,745,862 A | * | 4/1998 | Hirano .............. 701/1 |
| 5,878,357 A | * | 3/1999 | Sivashankar et al. ..... 701/1 |
| 6,145,614 A | * | 11/2000 | Kimura et al. ........ 180/248 |
| 6,272,418 B1 | * | 8/2001 | Shinmura et al. ....... 701/72 |
| 6,289,281 B1 | * | 9/2001 | Shinmura et al. ....... 701/301 |
| 6,453,226 B1 | * | 9/2002 | Hac et al. ........... 701/48 |
| 6,553,293 B1 | * | 4/2003 | Hac ................. 701/42 |
| 6,618,651 B1 | * | 9/2003 | Tan ................. 701/1 |
| 6,697,728 B2 | * | 2/2004 | Kin et al. ........... 701/70 |
| 6,766,239 B2 | * | 7/2004 | Barron et al. ........ 701/71 |
| 6,830,122 B2 | * | 12/2004 | Kroppe .............. 180/197 |

(Continued)

FOREIGN PATENT DOCUMENTS

EP 0 460 547 A2 12/1991

(Continued)

*Primary Examiner*—Thomas Black
*Assistant Examiner*—Jorge O. Peche
(74) *Attorney, Agent, or Firm*—Birch, Stewart, Kolasch & Birch, LLP

(57) ABSTRACT

An apparatus for controlling driving forces supplied to left and right wheels of a vehicle, for effectively inhibiting oversteer and understeer states, includes driving force adjusting device for adjusting driving forces supplied to the left and the right rear wheels, first controlling device for controlling the driving force adjusting device such that a wheel speed difference between the left and the right rear wheels coincides with a target wheel speed difference, and second controlling device for controlling the driving force adjusting device such that a yaw momentum of the vehicle coincides with a target yaw momentum. If the vehicle is in an understeer state, the contribution of the second controlling device is increased relative to that the first controlling device and if the vehicle is in an oversteer state, the contribution of the first controlling device is increased relative to that of the second controlling device.

14 Claims, 2 Drawing Sheets

U.S. PATENT DOCUMENTS

| | | |
|---|---|---|
| 6,922,617 B2 * | 7/2005 | Kogure et al. ................. 701/1 |
| 7,007,763 B2 * | 3/2006 | Ginther et al. ............... 180/6.2 |
| 2002/0143451 A1 * | 10/2002 | Hac et al. ..................... 701/48 |
| 2003/0163226 A1 * | 8/2003 | Tan ............................... 701/1 |
| 2003/0191572 A1 * | 10/2003 | Roll et al. .................... 701/70 |
| 2003/0195667 A1 * | 10/2003 | Tange et al. ................... 701/1 |
| 2004/0153228 A1 * | 8/2004 | Matsumoto et al. .......... 701/41 |
| 2005/0090943 A1 * | 4/2005 | Kogure et al. ................. 701/1 |
| 2005/0096826 A1 * | 5/2005 | Iwasaka et al. .............. 701/70 |
| 2005/0096827 A1 * | 5/2005 | Sadano et al. ............... 701/70 |
| 2005/0096828 A1 * | 5/2005 | Uemura et al. ............... 701/70 |
| 2005/0096829 A1 * | 5/2005 | Sugano et al. ............... 701/70 |
| 2005/0107939 A1 * | 5/2005 | Sadano et al. ............... 701/70 |
| 2006/0167595 A1 * | 7/2006 | Breed et al. ................... 701/1 |

FOREIGN PATENT DOCUMENTS

| | | |
|---|---|---|
| EP | 1 364 848 A1 | 11/2003 |
| EP | 1 403 125 A2 | 3/2004 |
| GB | 2 321 287 A | 7/1998 |
| JP | 4-342615 A | 11/1992 |
| JP | 7-25256 A | 1/1995 |
| JP | 7-108843 A | 4/1995 |
| JP | 3114457 B2 | 9/2000 |
| JP | 2002-114049 A | 4/2002 |

* cited by examiner

APPARATUS AND METHOD FOR CONTROLLING DRIVING FORCE SUPPLIED TO WHEELS ON OPPOSITE SIDES OF VEHICLE

BACKGROUND OF THE INVENTION

1. Field of the Invention

The present invention relates to an apparatus and a method for controlling driving forces supplied to left and right wheels of a vehicle.

2. Description of the Related Art

Conventionally, a technique that changes the driving force to be supplied to each of left and right wheels has been known (e.g., reference 1: Japanese Patent Application Laid-Open (KOKAI) publication number 2002-114049, and reference 2: Japanese Patent number 3114457). Such a technique arranges a driving force distribution mechanism along with the differential gear between a left driving wheel and a right driving wheel and controls the driving force distribution mechanism to thereby control driving force to be supplied to each of the wheels.

The following two feedback controls are typically applied to a driving force supply mechanism.

1. left-right wheel speed difference feedback control:

A target wheel speed difference between a speed of the left wheel and that of the right wheel is set in accordance with a steering angle and a vehicle speed, and the driving force distribution mechanism is controlled such that an actual wheel speed difference between an actual speed of the left wheel and that of the right wheel coincides with the target wheel speed difference. In such a manner, a turning characteristic (an understeer or an oversteer) of a vehicle is not accurately controlled but inhibits slip of one wheel (especially the inner wheel) when the vehicle is accelerated, so that it is possible to improve the traction.

2. yaw rate feedback control:

A target yaw rate matching a steering angle and a vehicle speed is set and the driving force distribution mechanism is controlled in such a manner that an actual yaw rate follow-up the target yaw rate. This control improves a turning characteristic of a vehicle in a cornering limit region or during acceleration.

A combination of the above two feedback control is applied to the driving force distribution mechanism and results as follows.

By way of example, when a turning characteristic of a vehicle is an understeer state and the inner wheel slips, left-right wheel speed difference feedback control outputs a control signal to shift torque to the outer wheel and the yaw rate feedback control also outputs a control signal to shift torque to the outer wheel.

As a consequence, the left-right wheel speed difference feedback control and the yaw rate feedback control carry out control in the same direction, so that traction and steering stability are improved concurrently.

However, a simple combination of the left-right wheel speed difference feedback control and the yaw rate feedback control may output control signals (control amounts) for inverse controls when a vehicle is in some states, so that the control signals offsets the effects of the both of the controls and driving force distribution control sometimes does not achieve sufficient effect.

If the vehicle that is being accelerated and is making a turn is in an oversteer state and the inner wheel of the vehicle slips, the left-right wheel speed difference feedback control outputs a control signal to shift torque to the outer wheel but the yaw rate feedback control, meanwhile, a control signal to shift torque to the inner wheel.

As a result, the control signals issued by the two controls offset each other and the driving force distribution control does not problematically take effect.

With the foregoing problems in view, the object of the present invention is to provide an apparatus and a method for controlling driving forces supplied to left and right wheels that are able to effectively inhibit an oversteer state and an understeer state by eliminate interferences between the above two controls.

SUMMARY OF THE INVENTION

To attain the above object, as a first generic feature, there is provided an apparatus for controlling driving forces supplied to a left wheel and a right wheel of a vehicle, the apparatus including driving force adjusting device for adjusting a driving force to be supplied to the left wheel and that to be supplied to the right wheel and controlling device for controlling the driving force adjusting device, characterized in that the controlling device comprises: first controlling device for controlling the driving force adjusting device such that a difference between a speed of the left wheel and a speed of the right wheel coincides with a target wheel speed difference matching a running state of the vehicle; second controlling device for controlling the driving force adjusting device such that a yaw momentum generated on the vehicle coincides with a target yaw momentum matching the running state of the vehicle; and control amount adjusting device for changing a first contribution of the first controlling device to the driving force adjusting device and a second contribution of the second controlling device to the driving force adjusting device based on a turning state of the vehicle and outputting the first contribution and the second contribution, which have been changed, to the driving force adjusting mean.

As a preferable feature, if the vehicle is judged to be in an understeer state, the control amount adjusting device may increase the second contribution that is to be output to the driving force adjusting device relative to the first contribution; and if the vehicle is judged to be in an oversteer state, the control amount adjusting device may increase the first contribution that is to be output to the driving force adjusting device relative to the second contribution.

As another preferable feature, the control amount adjusting device may decrease a first control gain of the first controlling device in accordance with an increase in an index indicating an understeer state, and may decrease a second control gain of the second controlling device in accordance with an increase in an index indicating an oversteer state.

As an additional preferable feature, the control amount adjusting device may decrease a first control gain of the first controlling device to a predetermined value when an index indicating an understeer state is in excess of a predetermined value, and may decrease a second control gain of the second controlling device to a predetermined value when an index indicating an oversteer state is in excess of a predetermined value.

As a further preferable feature, the control amount adjusting device may set a first gain of the first controlling device and a second gain of the second controlling device such that a sum of the first gain and the second gain is a constant value.

As a second generic feature, there is provided a method for controlling driving forces supplied to a left wheel and a right wheel of a vehicle including driving force adjusting device for adjusting a driving force to be supplied to the left wheel and that to be supplied to the right wheel, comprising the steps of: (a) calculating a target wheel speed difference between the left wheel and the right wheel based on a running state of the vehicle; (b) setting a first elementary control amount that is to be applied to the driving force adjusting device such that an actual wheel speed difference between a speed of the left wheel and a speed of the right wheel coincides with the target wheel speed difference; (c) setting a target yaw rate of the vehicle based on the running state of the vehicle; (d) setting a second elementary control amount that is to be applied to the driving force adjusting device such that an actual yaw rate of the vehicle coincide with the target yaw rate; (e) judging a turning state of the vehicle based on the running state of the vehicle; and (f) changing the first elementary control amount and the second elementary control amount based on the turning sate of the vehicle and outputting the first elementary control amount and the second elementary control amount, which have been changed, to the driving force adjusting device.

As a preferable feature, if the turning state of the vehicle is judged to be in an understeer state, the second elementary control amount that is to be output to the driving force adjusting device may be increased relative to the first elementary control amount; and if the turning state of the vehicle is judged to be in an oversteer state, the first elementary control amount that is to be output to the driving force adjusting device may be increased relative to the second elementary control amount.

As another preferable feature, a first control gain for the first elementary control amount may be decreased in accordance with an increase in an index indicating an understeer state, and a second control gain for the second elementary control amount may be decreased in accordance with an increase in an index indicating an oversteering state.

As an additional feature, a first control gain for the first elementary control amount may be decreased to a predetermined value when an index indicating an understeer state is in excess of a predetermined value, and a second control gain for the second elementary control amount may be decreased to a predetermined value when an index indicating an oversteer state is in excess of a predetermined value.

As a further preferable feature, a first gain for the first elementary control amount and a second gain for the second elementary control amount may be set such that a sum of the first gain and the second gain is a constant value.

Other objects and further features of the present invention will be apparent from the following detailed description when read in conjunction with the accompanying drawings.

DESCRIPTION OF THE INVENTION

Figure 1:
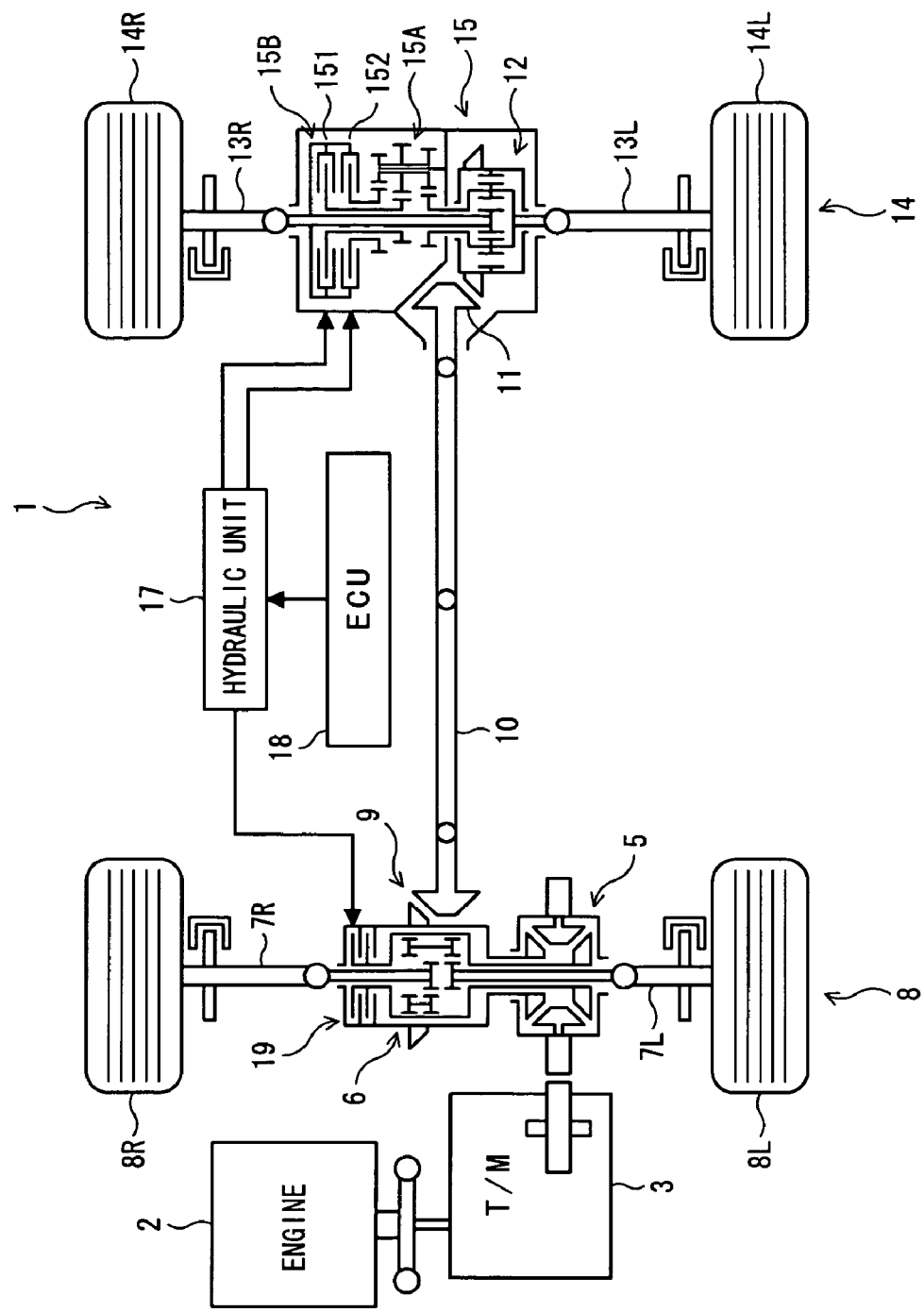
FIG. 1 is a block diagram schematically showing a vehicle to which an apparatus for controlling driving forces supplied to left and right wheels according to an embodiment of the present invention is applied.
Figure 2:
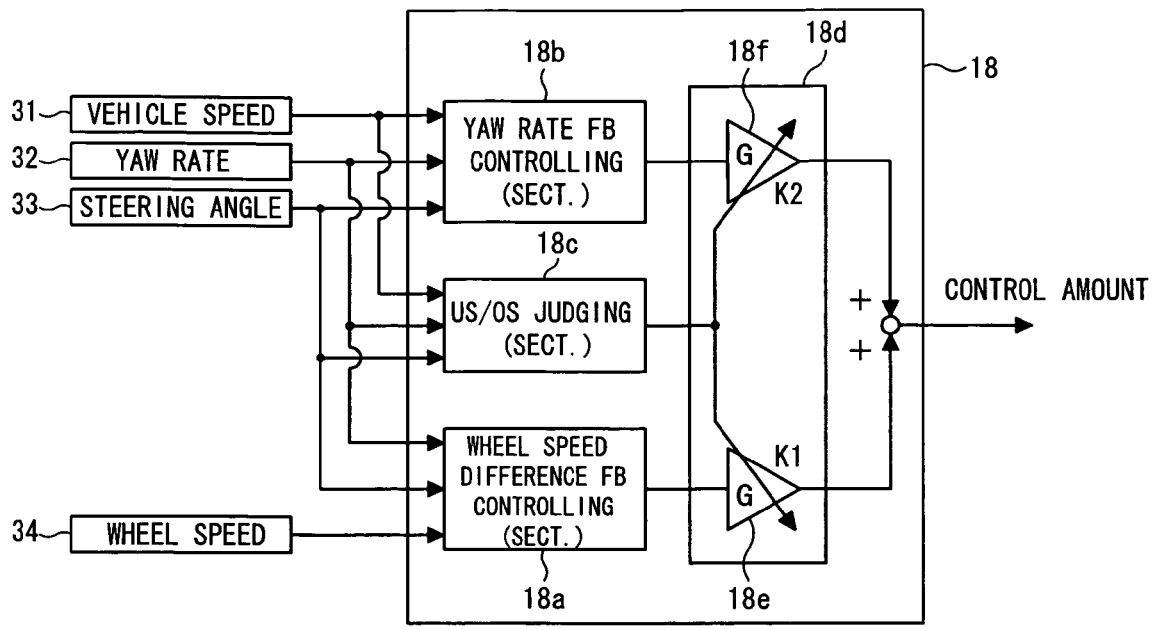
FIG. 2 is a block diagram schematically showing the main part of the apparatus for controlling driving forces supplied to left and right wheels of FIG. 1.
Figure 3:
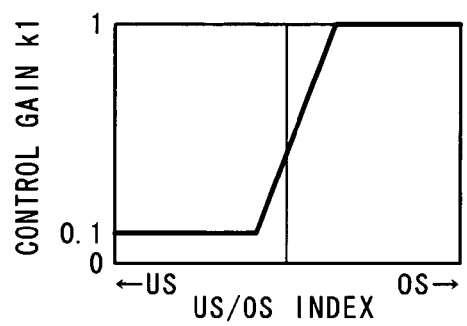
FIGS. 3 and 4 are maps respectively showing characteristics of control gains of apparatus for controlling driving forces supplied to left and right wheels of FIG. 1.
Figure 4:
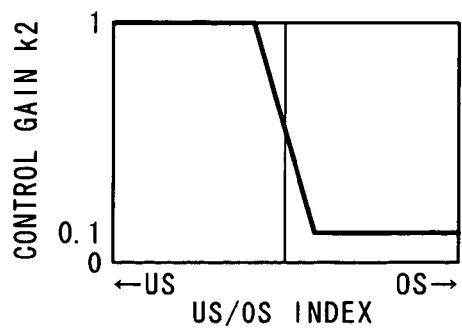

An apparatus for controlling driving force supplied to the left and right wheels according to an embodiment of the present invention will now be described with reference to the accompanying drawings. FIG. 1 schematically illustrates a vehicle to which the present invention is applied; FIG. 2 schematically shows the main part of the present invention; and FIGS. 3 and 4 are maps respectively showing characteristics of control gains of the present invention.

In FIG. 1, reference numbers 1, 2, and 3 represent a vehicle to which the present invention is applied, an engine, and a transmission, respectively. Power generated by the engine 2 is passed to a center differential (hereinafter called a center diff) 5 via the transmission 3. The center diff 5 divides the received power and supplies each of front wheels 8 and rear wheels 14.

Specifically, a portion of the power input to the center diff 5 is further sent to a front differential (hereinafter front diff) 6 and is passed to left front wheel 8L and right front wheel 8R respectively via axles 7L and 7R, and the remaining portion is passed to right rear wheel 14R and left rear wheel 14L via a bevel gear mechanism 9, a propeller shaft 10, a bevel gear mechanism 11, a rear differential (hereinafter called rear diff) 12 and axles 13L and 13R.

The center diff 5 of the vehicle 1 is equipped with a front-rear wheel power distribution mechanism 19 able to control driving force supply to front wheels 8 and the rear wheels 14. Further, the rear diff 12 is equipped with a left-right wheel power distribution mechanism (driving force adjusting means) 15 able to adjust driving forces that are to be supplied to the left rear wheel 14L and the right rear wheel 14R.

As shown in FIG. 1, the vehicle 1 includes a driving system hydraulic unit 17 for supplying oil pressure to the left-right wheel power distribution mechanism 15 and the front-rear wheel power distribution mechanism 19, and driving force supply controlling means (ECU) 18 for controlling the driving system hydraulic unit 17 to thereby control the left-right wheel power distribution mechanism 15 and the front-rear wheel power distribution mechanism 19 in an operating mode.

Here, the front-rear wheel power distribution mechanism 19 includes a multiplate hydraulic wet clutch mechanism. A change in engagement degree of the multiplate hydraulic wet clutch mechanism restricts a differential state between the front wheels 8 and the rear wheels 14, so that torque from the engine 2 can be variably supplied to the front and the rear wheels, 8 and 14 respectively. Additionally, the ECU 18 controls oil pressure that the driving system hydraulic unit 17 is to supply to the multiplate hydraulic wet clutch mechanism, and an engagement degree of the clutch mechanism is thereby controlled.

The left-right wheel power distribution mechanism 15 is formed by a transmission 15A and a variable-control torque transmission mechanism 15B. The transmission 15A increases or decreases the speed of rotating of one (here, the left wheel 14L) of the left and right wheels 14L, 14R, and outputs driving torque (matching the increase or the decrease) to the variable-control torque transmission mechanism 15B.

The variable-control torque transmission mechanism 15B includes two multiplate hydraulic wet clutch mechanisms that are able to adjust an amount of torque to be transmitted (to the wheels 14) and that is formed by an acceleration clutch 151 and a reduction clutch 152. Engagement states of the clutches 151, 152 are controlled by oil pressure supplied from the driving system hydraulic unit 17. Selective engagement of one of the clutches in accordance with a running state of the vehicle and another factor appropriately changes driving forces (torque) supplied to the left wheel 14L and the right wheel 14R, so that driving torque applied to one wheel can increase or decrease.

The above-described driving system hydraulic unit 17 includes a pump for pressurizing the working oil to a predetermined pressure, an accumulator for holding the pressurized working oil, a pressure sensor for monitoring a pressure of the oil pressurized by the pump and another element, which are however not illustrated. At a downstream point from the accumulator on a working oil supply line, there are provided an electromagnetic valve for switching between open and close states in accordance with on/off states of a control signal and a direction switching valve for switching a supply destination of oil pressure, which has been adjusted by the electromagnetic valve, between the acceleration clutch 151 and the reduction clutch 152, these valves being however omitted in the drawing.

Next, the main part of the apparatus of the present invention will now be described with reference to FIG. 2. The ECU 18 includes a CPU, a ROM, a RAM, an interface and other elements, which are however not shown in the drawing. As shown in FIG. 2, to the ECU 18, a vehicle speed sensor 31 for sensing a running speed of the vehicle 1, a yaw rate sensor 32 for sensing the yaw rate (yaw momentum) of the vehicle, a steering angle sensor 33 for sensing a steering angle of the vehicle, a wheel speed sensor 34 for sensing wheel speeds of the left and right rear wheels 14 are connected. Besides these sensors, various sensors exemplified by an engine rotational frequency sensor, a longitudinal G sensor, a lateral G sensor and a throttle position sensor are connected to the ECU 18.

On the basis of the data obtained by the above sensors, the ECU 18 sets a control signal for the driving system hydraulic unit 17 which signal matches the running state of the vehicle 1.

Further as shown in FIG. 2, the ECU 18 includes a left-right wheel speed difference feedback controlling section (first controlling means) 18*a*, a yaw-rate feedback controlling section (second controlling means) 18*b*, a turning state judging section (turning state judging means) 18*c* and a gain controller (control amount adjusting means) 18*d*.

The left/right wheel speed difference feedback controlling section 18*a* calculates a target value (a target wheel speed difference) of a difference of a speed of the left wheel and that of the right wheel which value matches the running state of the vehicle 1 based on a vehicle speed and a steering angle respectively obtained by the vehicle speed sensor 31 and the steering angle sensor 33, and controls the left-right wheel power distribution mechanism 15 such that an actual difference (an actual wheel speed difference) between the actual speed of the left wheel and that of the right wheel coincides with the calculated target wheel speed difference. For this control, the left-right wheel speed difference feedback controlling section 18*a* outputs a elementary control amount (a first elementary control amount) for the left-right wheel power distribution mechanism 15 to the gain controller 18*d* such that an actual wheel speed difference coincides with a target wheel speed difference.

Here, simple description is made in relation to the manner of calculation of a target wheel speed difference $DV_T$ performed by the left-right wheel speed difference feedback controlling section 18*a*. The target wheel speed difference is derived from the following formula (1) where V represents the vehicle speed sensed by the vehicle speed sensor 31; δ, the steering angle sensed by the steering angle sensor 33; L, the wheel base of the vehicle 1; t, the tread of the vehicle 1; A, the stability factor of the vehicle 1; and Gr, the steering gear ratio.

$$DV_T = V \cdot \delta \cdot t / [(1 + A \cdot V^2) \cdot L \cdot Gr] \tag{1}$$

The yaw-rate feedback controlling section 18*b* calculates a target value (a target yaw rate) of a yaw rate (a yaw momentum generated on the vehicle 1) which target value matches the running sate of the vehicle 1 based on the vehicle speed and the steering angle respectively obtained by the vehicle speed sensor 31 and the steering angle sensor 33, and controls the left-right wheel power distribution mechanism 15 such that an actual yaw rate coincides with the calculated target yaw rate matching the running state of the vehicle 1. Specifically, the yaw-rate feedback controlling section 18*b* carries out the control by outputting an elementary control amount (second elementary control amount) to the left-right wheel power distribution mechanism 15 so that the actual yaw rate coincide with the target yaw rate.

Subsequently, a manner in which the yaw-rate feedback controlling section 18*b* calculates a target yaw rate $\gamma_T$ will now be briefly described. Assuming that V represents the vehicle speed sensed by the vehicle speed sensor 31; δ, the steering angle sensed by the steering angle sensor 33; L, the wheel base of the vehicle 1; and A, the stability factor of the vehicle 1, a target yaw rate $\gamma_T$ is calculated by the following formula (2).

$$\gamma_T = \delta \cdot V / ((L \cdot (1 - A \cdot V^2)) \tag{2}$$

The turning state judging section 18*c* judges the turning vehicle 1 is in an understeer state or an oversteer state on the basis of the vehicle speed obtained by the vehicle speed sensor 31, an actual yaw rate (yaw momentum generated on the vehicle 1) obtained by the yaw rate sensor 32 and a steering angle obtained by the steering angle sensor 33. The turning state judging section 18*c* outputs an index (hereinafter called a judgment index) indicating whether the vehicle 1 in a turning state is in an understeer state or an oversteer state to the gain controller 18*d*.

For example, the turning state judging section 18*c* calculates a judgment index in the following manner.

First of all, a variation $\gamma_{err}$ between a target yaw rate $\gamma_T$ and an actual yaw rate $\gamma_R$ is calculated by the following formula (3).

$$\gamma_{err} = \gamma_T - \gamma_R \tag{3}$$

Assuming that a right-direction lateral acceleration Ay is + (should read as "plus") and right-handed yaw rate is +, a judgment index $C_{US/OS}$ is set in the following manner.

When Ay ≧ 0 (i.e., the lateral G is in the right direction and the yaw rate is minus because the vehicle makes a left turn), $$C_{US/OS} = \gamma_{err} \tag{4}$$

When Ay < 0 (i.e., the lateral G is in the left direction and the yaw rate is plus because the vehicle makes a right turn), $$C_{US/OS} = -\gamma_{err} \tag{5}$$

A judgment index $C_{US/OS}$ obtained by the above formulae (4) and (5) quantitatively indicates a turning state of the vehicle: a larger judgment index $C_{US/OS}$ has a stronger tendency of oversteer; and a smaller (larger in negative direction) judgment index $C_{US/OS}$ has a stronger tendency of understeer. By the way, a judgment index $C_{US/OS}$ equal to zero ($C_{US/OS} = 0$) indicates the vehicle in a so-called neutral-steer.

Subsequently, a judgment index $C_{US/OS}$ determined thus is sent to the gain controller 18*d*.

Next, description will be made in relation to the gain controller 18*d*; if the turning state judging section 18*c* judges that the vehicle 1 is in an understeer state ($C_{US/OS}$<0), the turning state judging section 18*c* increases a contribution of the yaw-rate feedback controlling section 18*b* relative to the left-right wheel speed difference feedback controlling section 18*a* in accordance with the largeness of the judgment index $C_{US/OS}$, and outputs the contribution to the left-right wheel power distribution mechanism 15; and conversely, if the vehicle 1 is in an oversteer state ($C_{US/OS}$>0), the gain controller 18*d* increases a contribution of the left-right wheel speed difference feedback controlling section 18*a* relative to the yaw-rate feedback controlling section 18*b* in accordance with the largeness of the judgment index $C_{US/OS}$, and outputs the increased contribution to the left-right wheel power distribution mechanism 15.

In more detail, the gain controller 18*d* is formed by a first gain controller 18*e* and a second gain controller 18*f* as shown in the drawing. The first gain controller 18*e* sets a gain k1 for a first elementary control amount determined by the left-right wheel speed difference feedback controlling section 18*a* and the second gain controller 18*f* set a gain k2 for a second elementary control amount determined by the yaw-rate feedback controlling section 18*b*.

The first and the second gain controllers 18*e* and 18*f* retain control gain setting maps, respectively, shown in FIGS. 3 and 4 and determine control gains k1 and k2 with reference to the control gain setting maps, using the judgment index $C_{US/OS}$ as a parameter.

As shown in the map in FIG. 3, the control gain k1 has a characteristic to be set larger when a judgment index $C_{US/OS}$ indicates a stronger oversteer tendency and set smaller when the judgment index $C_{US/OS}$ indicates a stronger understeer tendency as long as judgment index $C_{US/OS}$ is in a predetermined range. Further, as shown in the drawing, the control gain k1 is held at the upper limit (the maximum value, e.g., 1) when the judgment index $C_{US/OS}$ is above the predetermined range (i.e., outside the range on the oversteer side) and is held at the lower limit (the minimum value, e.g., 0.1) when the judgment index $C_{US/OS}$ is below the predetermined range (i.e., outside the range on the understeer side).

As shown in FIG. 4, the control gain k2 has an inverse characteristic of that of the control gain k1. Namely, the control gain k2 has a characteristic to be set smaller when a judgment index $C_{US/OS}$ indicates a stronger oversteer tendency and set larger when the judgment index $C_{US/OS}$ indicates a stronger understeer tendency as long as judgment index $C_{US/OS}$ is in a predetermined range. Further, as shown in the drawing, the control gain k2 is held at the lower limit (the minimum value, e.g., 0.1) when the judgment index $C_{US/OS}$ is above the predetermined range (i.e., outside the range on the oversteer side) and is held at the upper limit (the maximum value, e.g., 1) when the judgment index $C_{US/OS}$ is below the predetermined range (i.e., outside the range on the understeer side). In this embodiment, the characteristics of the gains k1, k2 are determined such that the sum (k1+k2) of the gains is always a constant value (e.g., 1.1).

Upon determination of the gains k1, k2 in the first and the second gain controllers 18*e* and 18*f* respectively, the product of the first elementary control amount and the gain k1 is added to the product of the second elementary control amount and the gain k2 to calculate the final control amount. On the basis of the calculated control amount, driving force to be supplied to each of the left and the right wheels is adjusted.

In the apparatus for controlling driving force supplied to the left and right wheels according to this embodiment that has the above-described configuration, the following manner sets a control signal (a control amount) to be applied to the left-right wheel power distribution mechanism 15.

First of all, left-right wheel speed difference feedback controlling section 18*a* calculates a target wheel speed difference based on a steering angle and a vehicle speed, and determines a control amount (a first elementary control amount) that is to be applied to the left-right wheel power distribution mechanism 15 such that an actual wheel speed difference coincides with the target wheel speed difference.

The yaw-rate feedback controlling section 18*b* calculates a target yaw rate based on the vehicle speed, a yaw rate and the steering angle, and determines a control amount (a second elementary control amount) that is to be applied to the left-right wheel power distribution mechanism 15 such that an actual yaw rate coincide with the target yaw rate.

Further, the turning state judging section 18*c* calculates a judgment index $C_{US/OS}$ based also on the vehicle speed, the yaw rate and the steering angle, and judges a turning state of the vehicle 1.

The gain controllers 18*e* and 18*f* respectively set the gains k1 and k2 for the control signals that have been determined in the left-right wheel speed difference feedback controlling section 18*a* and the yaw-rate feedback controlling section 18*b*.

The products of the first elementary control amount and the gain k1 and the products of the second elementary control amount and the gain k2 are added together and the resultant sum, serving as a final control signal (control amount), is sent to the left-right wheel power distribution mechanism 15. Whereupon driving forces are supplied to the left and the right wheels individually.

Calculation of the control amount for the left-right wheel power distribution mechanism 15 in the above manner inhibits interference between the yaw-rate feedback control and the left-right wheel speed difference control, so that the two controls can be applied concurrently and it is possible to eliminate the problem that the effects of the two controls cancel each other out.

More specifically, if the vehicle 1 is in an understeer state (i.e., $C_{US/OS}$<0), the gain k1 is set to be small and the gain k2 is set to be large, so that the control amount determined by the yaw-rate feedback controlling section 18*b* become larger relative to that determined by the left-right wheel speed difference feedback controlling section 18*a*. In other words, the yaw-rate feedback control affects the wheels more strongly and the left-right wheel speed difference feedback control affects the wheels weakly.

In this case, the yaw-rate feedback control causes driving force to shift from the inner rotating wheel to the outer wheel and yaw moment is generated in the direction encouraging the vehicle to make the turn. At that time, since the gain k1 for the left-right wheel speed difference feedback control is decreased (that is, restriction in terms of wheel speed abates), the shift of the driving force causes the outer wheel to easily slip, and such a slip declines lateral-force allowance and acts in such a direction that the understeer is inhibited. For this reason, weakening the left-right wheel speed difference feedback control, which inhibits slip, can enhance the effect of understeer inhibition.

When the vehicle 1 is judged to be in an understeer state, the yaw-rate feedback control takes priority over the left-right wheel speed difference feedback control, which consequently less affects on the wheels, as explained above, it is possible to supply a larger driving force to the outer rear wheel. A synergistic effect of an increase in a driving force to be supplied to the outer rear wheel and a decrease in lateral force of the rear wheels due to allowing slip of the outer wheel efficiently improves turning capability of the vehicle. As a result, it is possible to extremely efficiently inhibit understeer.

On the other hand, if the vehicle 1 is in an oversteer state ($C_{US/OS}>0$), the gain k1 is set to be large and the gain k2 is set to be small. Concerning the contributions to the entire control amount, the control amount determined by the left-right wheel speed difference feedback controlling section 18a is large relative to the control amount determined by the yaw-rate feedback controlling section 18b. Consequently, the left-right wheel speed difference feedback control affects the wheels strongly and the yaw-rate feedback control affects the wheels weakly.

Here, since while the vehicle is in an oversteer state, the yaw-rate feedback control applied during the turning causes the driving force to shift from the outer wheel to the inner wheel, the shift of the driving force conceivably results in easy slip of the inner wheel original having a small vertical load. Such wheel slip declines lateral force on the rear wheels, so that oversteer inhabitation and also friction are reduced. As a solution, when the vehicle is in oversteer state, the apparatus for controlling driving force supplied to the left and right wheels of this embodiment abates yaw-rate feedback control and intensifies the left-right wheel speed difference feedback control in order to inhibit a shift of driving force from the outer wheel to inner wheel. That solves the above problem.

As described above, since the judgment that the vehicle 1 is in an oversteer state makes the left-right wheel speed difference feedback control override the yaw-rate feedback control, which therefore less affects the wheels, it is possible to ensure stable traction, inhibiting slip. Further, improvement in lateral force accompanied by the slip inhabitation can inhibit oversteer.

Further, the present invention should by no means be limited to this foregoing embodiment, and various changes or modifications may be suggested without departing from the gist of the invention. For example, the gain control maps should by no means be limited to those exemplified by FIGS. 3 and 4 and, alternatively, may be modified in accordance with various factors of the vehicle and a steering characteristic. The gains k1 and k2 are determined so as to make a sum of a constant value but should by no means be limited to this feature.

What is claimed is:

1. An apparatus for controlling driving forces supplied to a left wheel and a right wheel of a vehicle, comprising:
   a driving force adjusting device for adjusting a driving force to be supplied to the left wheel and that to be supplied to the right wheel;
   a first controlling device for controlling said driving force adjusting device such that a difference between a speed of the left wheel and a speed of the right wheel coincides with a target wheel speed difference matching a running state of the vehicle;
   a second controlling device for controlling said driving force adjusting device such that a yaw momentum generated on the vehicle coincides with a target yaw momentum matching the running state of the vehicle; and
   a control amount adjusting device for changing a gain of a first contribution of said first controlling device to a second contribution of said second controlling device based on a turning state of the vehicle and outputting both the first contribution and the second contribution, in accordance with the changed gain, to said driving force adjusting device.

2. An apparatus according to claim 1, wherein:
   if the vehicle is judged to be in an understeer state, said control amount adjusting device increases the second contribution that is to be output to said driving force adjusting device relative to the first contribution; and
   if the vehicle is judged to be in an oversteer state, said control amount adjusting device increases the first contribution that is to be output to said driving force adjusting device relative to the second contribution.

3. An apparatus according to claim 1, wherein said control amount adjusting device decreases the gain of the first contribution to the second contribution by decreasing a first control gain of said first controlling device in accordance with an increase in an index indicating an understeer state.

4. An apparatus according to claim 1, wherein said control amount adjusting device increases the gain of the first contribution to the second contribution by decreasing a second control gain of said second controlling device in accordance with an increase in an index indicating an oversteer state.

5. An apparatus according to claim 1, wherein said control amount adjusting device decreases the gain of the first contribution to the second contribution by decreasing a first control gain of said first controlling device to a predetermined value when an index indicating an understeer state is in excess of a predetermined value.

6. An apparatus according to claim 1, wherein said control amount adjusting device increases the gain of the first contribution to the second contribution by decreasing a second control gain of said second controlling device to a predetermined value when an index indicating an oversteer state is in excess of a predetermined value.

7. An apparatus according to claim 1, wherein said control amount adjusting device sets a first gain of said first controlling device and a second gain of said second controlling device such that a sum of the first gain and the second gain always take a constant value regardless of the changed gain.

8. A method for controlling driving forces supplied to a left wheel and a right wheel of a vehicle including driving force adjusting device for adjusting a driving force to be supplied to the left wheel and that to be supplied to the right wheel, comprising:
   calculating a target wheel speed difference between the left wheel and the right wheel based on a running state of the vehicle;
   setting a first elementary control amount that is to be applied to the driving force adjusting device such that an actual wheel speed difference between a speed of the left wheel and a speed of the right wheel coincides with the target wheel speed difference;
   setting a target yaw rate of the vehicle based on the running state of the vehicle;
   setting a second elementary control amount that is to be applied to the driving force adjusting device such that an actual yaw rate of the vehicle coincide with the target yaw rate;
   judging a turning state of the vehicle based on the running state of the vehicle; and
   changing a gain of the first elementary control amount to the second elementary control amount based on the turning safe of the vehicle and outputting the first elementary control amount and the second elementary control amount, in accordance with the changed gain, to the driving force adjusting device.

9. A method according to claim 8, wherein if the turning state of the vehicle is judged to be in an understeer state, the second elementary control amount that is to be output to the driving force adjusting device is increased relative to the first elementary control amount; and if the turning state of the vehicle is judged to he in an oversteer state, the first elementary control amount that is to be output to the driving force adjusting device is increased relative to the second elementary control amount.

10. A method according to claim 8, wherein a first control gain for the first elementary control amount is decreased in accordance with an increase in an index indicating an understeer state to decrease the gain of the first contribution to the second contribution.

11. A method according to claim 8, wherein a second control gain for the second elementary control amount is decreased in accordance with an increase in an index indicating an oversteering state to increase the gain of the first contribution to the second contribution.

12. A method according to claim 8, wherein a first control gain for the first elementary control amount is decreased to a predetermined value when an index indicating an understeer state is in excess of a predetermined value to decrease the gain of the first contribution to the second contribution.

13. A method according to claim 8, wherein a second control gain for the second elementary control amount is decreased to a predetermined value when an index indicating an oversteer state is in excess of a predetermined value to increase decrease the gain of the first contribution to the second contribution.

14. A method according to claim 8, wherein a first gain for the first elementary control amount and a second gain for the second elementary control amount are set such that a sum of the first gain and the second gain always take a constant value regardless of the changed gain.

* * * * *